United States Patent
Miyake et al.

(10) Patent No.: US 11,241,621 B2
(45) Date of Patent: Feb. 8, 2022

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Youichiro Miyake, Tokyo (JP); Makoto Hasegawa, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/006,621

(22) Filed: Aug. 28, 2020

(65) Prior Publication Data
US 2021/0060432 A1    Mar. 4, 2021

(30) Foreign Application Priority Data
Sep. 3, 2019 (JP) .............................. JP2019-160517

(51) Int. Cl.
*A63F 13/57*    (2014.01)
*A63F 13/69*    (2014.01)

(52) U.S. Cl.
CPC .............. *A63F 13/57* (2014.09); *A63F 13/69* (2014.09)

(58) Field of Classification Search
CPC .......... A63F 13/57; A63F 13/69; A63F 13/56; A63F 13/358; A63F 2300/53; A63F 2300/534; A63F 2300/60; A63F 2300/6027
USPC ........................................................... 463/31
See application file for complete search history.

(56) References Cited

U.S. PATENT DOCUMENTS

| | | | |
|---|---|---|---|
| 6,292,198 B1 | 9/2001 | Matsuda et al. | |
| 7,440,447 B2* | 10/2008 | Kareev | H04L 67/38 370/359 |
| 8,005,066 B2* | 8/2011 | Uri | H04L 67/38 370/351 |
| 2007/0276709 A1 | 11/2007 | Trimby et al. | |
| 2008/0220862 A1* | 9/2008 | Axelrod | G06T 19/003 463/31 |
| 2009/0150790 A1 | 6/2009 | Wilhelm | |
| 2010/0235608 A1* | 9/2010 | Armoni | G06F 30/20 712/17 |
| 2014/0115533 A1 | 4/2014 | Suzuki et al. | |

(Continued)

FOREIGN PATENT DOCUMENTS

JP        2012213485 A     11/2012

*Primary Examiner* — Allen Chan
(74) *Attorney, Agent, or Firm* — Dorsey & Whitney LLP

(57) ABSTRACT

A non-transitory computer-readable medium including a video game processing program for causing a server to perform functions regarding a search of a moving route in a virtual space is provided. The functions include a setting function, an arranging function, a thinning function, and a searching function. The setting function is configured to set a navigation mesh corresponding to a movable area of an object in a virtual space. The arranging function is configured to arrange a plurality of waypoints on the set navigation mesh in accordance with a predetermined arrangement rule. The thinning function is configured to thin out some waypoints, which are selected in accordance with a predetermined selection rule, from the plurality of waypoints thus arranged. The searching function is configured to search a moving route of the object on a basis of arrangement of the plurality of thinned waypoints.

7 Claims, 11 Drawing Sheets

(56) References Cited

U.S. PATENT DOCUMENTS

| | | | |
|---|---|---|---|
| 2018/0012403 A1* | 1/2018 | Luo | A63F 13/358 |
| 2018/0250595 A1 | 9/2018 | Kurabayashi | |
| 2019/0026956 A1* | 1/2019 | Gausebeck | H04N 13/10 |

* cited by examiner

REGION RELATED INFORMATION

| REGION NUMBER | BELONGING WAYPOINT | ... |
|---|---|---|
| 1 | W10, W11, W12, ... | ... |
| 2 | W20, W21, W22, ... | ... |
| 3 | W30, W31, W32, ... | ... |
| ⋮ | ⋮ | ⋮ |

NON-TRANSITORY COMPUTER-READABLE MEDIUM AND VIDEO GAME PROCESSING SYSTEM

CROSS-REFERENCE TO RELATED APPLICATION (S)

The present application claims priority to Japanese Patent Application No. 2019-160517 filed on Sep. 3, 2019, the disclosure of which is expressly incorporated herein by reference in its entirety.

BACKGROUND OF THE INVENTION

1. Field of the Invention

At least one of embodiments of the present invention relates to a non-transitory computer-readable medium including a video game processing program and a video game processing system for causing a server to perform functions regarding a search of a moving route in a virtual space.

2. Description of the Related Art

Heretofore, various kinds of techniques for moving a character in a video game have been proposed.

In such techniques, there is one in which a moving route of a character is searched by using positional information regarding a virtual space that constitutes a video game, and this technique utilizes a navigation mesh and waypoints. In order to suppress a processing load required for a search of the moving route from being increased, there is one in which arrangement of route candidate locations in a search region is determined so that an interval between route candidate locations arranged outside a predetermined area is greater than an interval of route candidate locations arranged in the predetermined area of the search region. Examples of apparatuses, systems, and programs may be found in Japanese Published Patent Application No. JP2012-213485A.

SUMMARY

However, in the conventional technique, the more the number of waypoints (route candidate locations) that become a search target is increased, the more a processing load required for arrangement of waypoints and a route search for the arranged waypoints is increased. For this reason, a processing load when movement of an object, such as a character, which can move in a virtual space is controlled may become excessive.

It is an object of at least one of embodiments of the present invention to solve the problem described above, and reduce a processing load required for a search of a moving route of an object.

According to one non-limiting aspect of the present invention, there is provided a non-transitory computer-readable medium including a video game processing program for causing a server to perform functions regarding a search of a moving route in a virtual space.

The functions include a setting function configured to set a navigation mesh corresponding to a movable area of an object in a virtual space.

The functions also include an arranging function configured to arrange a plurality of waypoints on the set navigation mesh in accordance with a predetermined arrangement rule.

The functions also include a thinning function configured to thin out some waypoints, which are selected in accordance with a predetermined selection rule, from the plurality of waypoints thus arranged.

The functions also include a searching function configured to search a moving route of the object on a basis of arrangement of the plurality of thinned waypoints.

According to another non-limiting aspect of the present invention, there is provided a video game processing system for executing a process regarding a search of a moving route in a virtual space. In this case, the video game processing system includes a communication network, a server, and a user terminal.

The video game processing system includes a setting unit configured to set a navigation mesh corresponding to a movable area of an object in a virtual space.

The video game processing system also includes an arranging unit configured to arrange a plurality of waypoints on the set navigation mesh in accordance with a predetermined arrangement rule.

The video game processing system also includes a thinning unit configured to thin out some waypoints, which are selected in accordance with a predetermined selection rule, from the plurality of waypoints thus arranged.

The video game processing system also includes a searching unit configured to search a moving route of the object on a basis of arrangement of the plurality of thinned waypoints.

According to still another non-limiting aspect of the present invention, there is provided a non-transitory computer-readable medium including a video game processing program for causing a user terminal to perform functions regarding a search of a moving route in a virtual space.

The functions include a setting function configured to set a navigation mesh corresponding to a movable area of an object in a virtual space.

The functions also include an arranging function configured to arrange a plurality of waypoints on the set navigation mesh in accordance with a predetermined arrangement rule.

The functions also include a thinning function configured to thin out some waypoints, which are selected in accordance with a predetermined selection rule, from the plurality of waypoints thus arranged.

The functions also include a searching function configured to search a moving route of the object on a basis of arrangement of the plurality of thinned waypoints.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
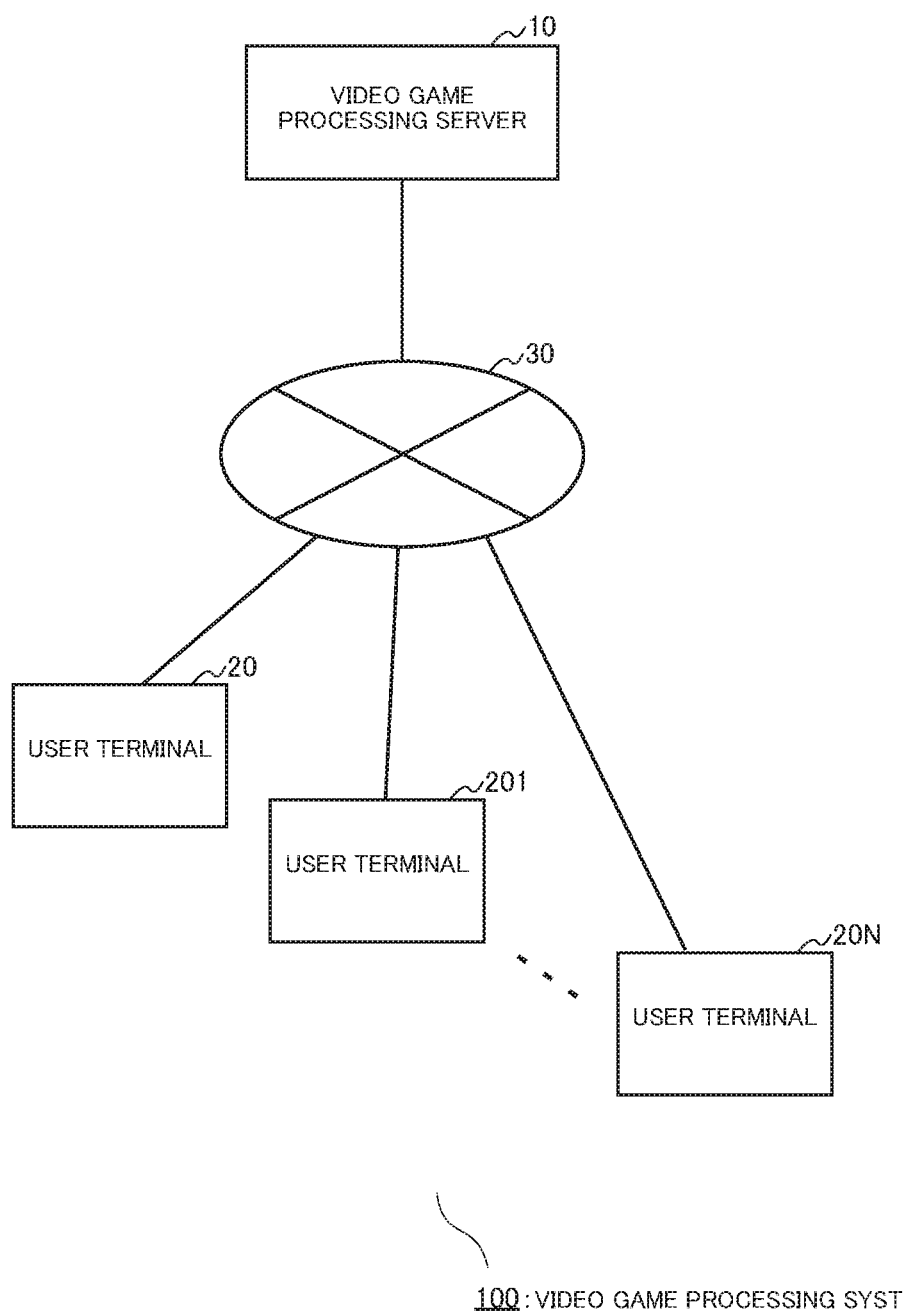
FIG. 1 is a block diagram illustrating an example of a configuration of a video game processing system corresponding to at least one of the embodiments of the present invention.

FIG. 1 is a block diagram illustrating an example of a configuration of a video game processing system 100 according to one embodiment of the present invention. As illustrated in FIG. 1, the video game processing system 100 includes a video game processing server 10 (hereinafter, referred to as a "server 10") and user terminals 20, and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. In this regard, the server 10 is provided with a general configuration for executing the various kinds of processing as a computer, such as a control section and a communicating section. However, its explanation herein is omitted. Further, in the video game processing system 100, it is preferable that the server 10 manages various kinds of information from a point of view to reduce a processing load on each of the plurality of user terminals 20 and 201 to 20N. However, a storing section for storing various kinds of information may include a storage region in a state that the server 10 can access the storage region. For example, the server 10 may be configured so as to be provided with a dedicated storage region outside the server 10.

Figure 2:
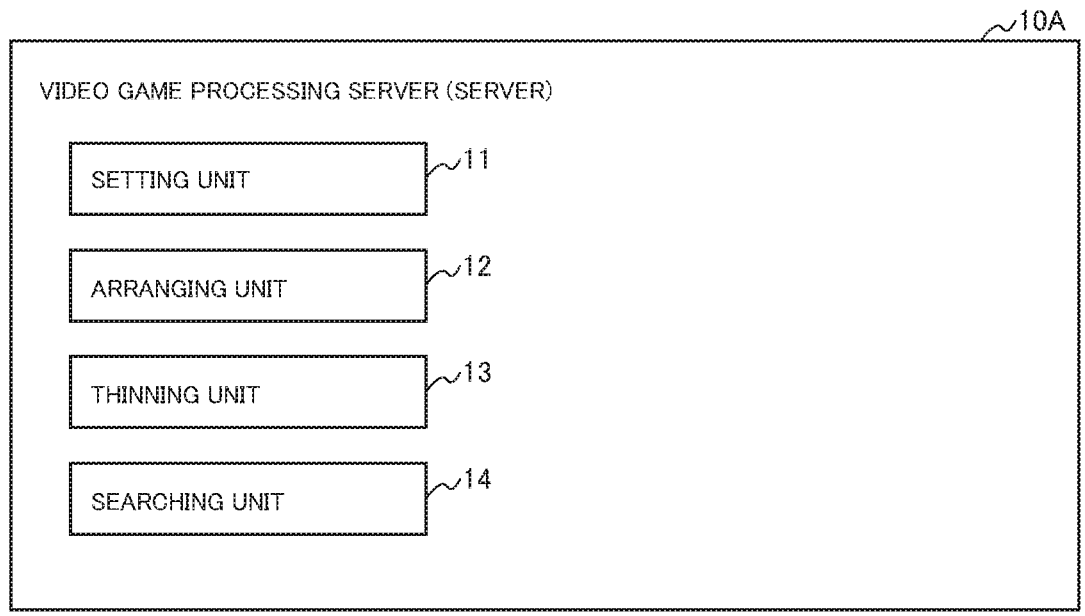
FIG. 2 is a block diagram illustrating a configuration of a server corresponding to at least one of the embodiments of the present invention.

FIG. 2 is a block diagram illustrating a configuration of a video game processing server 10A (hereinafter, referred to as a "server 10A"), which is an example of the video game processing server 10. As illustrated in FIG. 2, the server 10A at least includes a setting unit 11, an arranging unit 12, a thinning unit 13, and a searching unit 14.

The setting unit 11 has a function to set a navigation mesh corresponding to a movable area of an object in a virtual space.

Here, the object means one that can be arranged in the virtual space. A configuration of the object is not limited particularly. However, it is preferable that the object can be recognized by the user (or a player) of the user terminal 20. As examples of the object, there are a character that the user can operate (for example, a player character) and a character that the user cannot operate (for example, a non-player character).

Further, the movable area means an area in which movement of the object in the virtual space is allowed. A configuration of the movable area is not limited particularly. The movable area may be configured by a 2D map, or may be configured by a 3D map.

Further, the phrase "set a navigation mesh corresponding to a movable area" means that the navigation mesh is associated with the movable area in the virtual space. A configuration to set a navigation mesh is not limited particularly. For example, there is a configuration in which a passable flag is set for polygons each of which is contiguous to an initial position of the player.

The arranging unit 12 has a function to arrange a plurality of waypoints on the set navigation mesh in accordance with a predetermined arrangement rule.

Here, each of the waypoints means spot information with which information regarding a video game can be associated. Namely, each of the waypoints has a role as a base in which information necessary for the video game is embedded. A configuration of each of the waypoints is not limited particularly so long as a position on the navigation mesh can be specified by each of the waypoints. However, it is preferable that each of the waypoints is configured so that information, which may become useful in accordance with the purpose of the route search, can be associated with the waypoints. As an example of such a configuration, there is a configuration in which a XYZ position in a 3D space and a navigation mesh (hereinafter, "NavMesh") polygon ID under the waypoint are included.

Further, a configuration to arrange a plurality of waypoints in accordance with a predetermined arrangement rule is not limited particularly. The arranging unit 12 may be configured so as to differently use a plurality of arrangement rules. As an example of the arrangement rule, there is a rule of arranging waypoints by a flood fill algorithm (Floodfill) on the basis of the initial position of the player.

The thinning unit 13 has a function to thin out some waypoints, which are selected in accordance with a predetermined selection rule, from the plurality of waypoints thus arranged.

Here, a configuration to select some waypoints in accordance with a predetermined selection rule is not limited particularly. The thinning unit 13 may be configured so as to select some waypoints in a random manner. As an example of such a configuration, there is a configuration in which a predetermined ratio of waypoints is selected from the arranged waypoints in accordance with a rule for providing randomness by using random numbers.

Further, a phrase "thin out some waypoints" means that some waypoints are excluded from a target of the route search. A configuration to thin out some waypoints is not limited particularly. The thinning unit 13 may be configured so as to delete information, or may be configured so that information is left, and the fact that the information is not set to a target of the route search is recorded.

The searching unit 14 has a function to search a moving route of the object on the basis of arrangement of the plurality of waypoints after thinning out some waypoints.

Here, the phrase "search a moving route of the object" means that a route on which the object moves is defined by connecting a plurality of waypoints to each other. A configuration to search a moving route is not limited particularly. However, it is preferable that the searching unit 14 is configured so as to be capable of searching one route or a plurality of routes that satisfies a search condition. As an example of such a configuration, there is a configuration in which a known route search technique is adopted by using the respective waypoints as nodes.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter, referred to as the "system 100") according to the present embodiment will be described.

Figure 3:
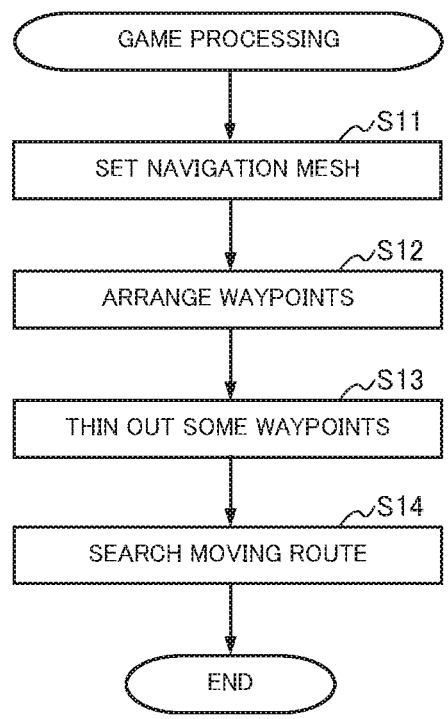
FIG. 3 is a flowchart illustrating an example of game processing corresponding to at least one of the embodiments of the present invention.

FIG. 3 is a flowchart illustrating an example of game processing executed by the system 100. In the game processing according to the present embodiment, processes related to controlling of progress of the video game is executed. Hereinafter, a case where the server 10A and the user terminal 20 (hereinafter, referred to as the "terminal 20") execute the game processing will be described as an example.

The game processing is started in a case where the terminal 20 that accesses the server 10A satisfies an arrangement condition for waypoints, for example. Hereinafter, a case where the user who operates the terminal 20 inputs a search request for a moving route will be described as an example.

In the game processing, the server 10A first sets a navigation mesh (Step S11). In the present embodiment, the server 10A specifies a virtual space to be provided to the terminal 20, and sets a navigation mesh corresponding to an area in the specified virtual space in which an object can move.

When the navigation mesh is set, the server 10A arranges waypoints (Step S12). In the present embodiment, the server 10A arranges a plurality of waypoints on the set navigation mesh in accordance with a predetermined arrangement rule.

When the waypoints are arranged, the server 10A thins out some waypoints (Step S13). In the present embodiment, the server 10A thins out some waypoints selected in accordance with a predetermined selection rule from the plurality of waypoints thus arranged.

When the waypoints are thinned out, the server 10A searches a moving route (Step S14). In the present embodiment, the server 10A searches a moving route of the object on the basis of arrangement of the plurality of waypoints that is arranged in the virtual space.

Figure 4:
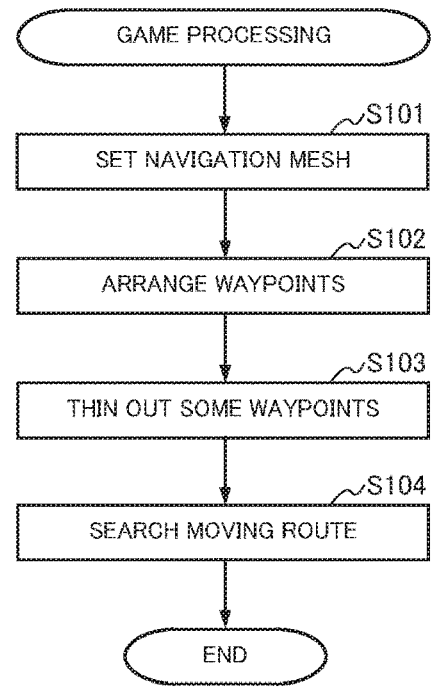
FIG. 4 is a flowchart illustrating an example of an operation of a server side in the game processing corresponding to at least one of the embodiments of the present invention.

FIG. 4 is a flowchart illustrating an example of an operation of the server 10A side in the game processing. Here, an operation of the server 10A in the system 100 will be described again.

In the game processing, the server 10A first sets a navigation mesh (Step S101); arranges waypoints on the set navigation mesh (Step S102); thins out some waypoints from the plurality of waypoints thus arranged (Step S103); and searches a moving route on the basis of arrangement of the waypoints that remain in a virtual space after thinning out some waypoints (Step S104).

Figure 5:
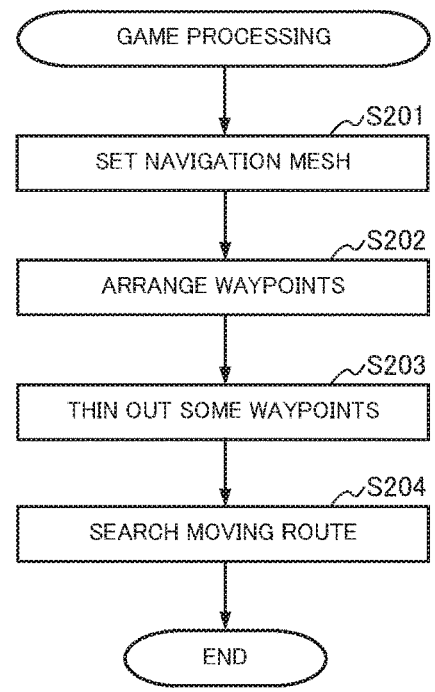
FIG. 5 is a flowchart illustrating an example of an operation of a terminal side in the game processing corresponding to at least one of the embodiments of the present invention.

FIG. 5 is a flowchart illustrating an example of an operation of the terminal 20 side in a case where the terminal 20 executes the game processing. Hereinafter, a case where the terminal 20 executes the game processing by a single body will be described as an example. In this regard, the configuration of the terminal 20 includes the similar functions to those of the server 10 except that the terminal 20 receives various kinds of information from the server 10. For this reason, its explanation is omitted from a point of view to avoid repeated explanation.

In the game processing, the terminal 20 first sets a navigation mesh (Step S201); arranges waypoints on the set navigation mesh (Step S202); thins out some waypoints from the plurality of waypoints thus arranged (Step S203); and searches a moving route on the basis of arrangement of the waypoints that remain in a virtual space after thinning out some waypoints (Step S204). In the present embodiment, the terminal 20 communicates with the server 10A to obtain information used for each of the steps. In this regard, the terminal 20 may be configured so as to refer to a storage unit included therein to specify the information used for each of the steps.

As explained above, as one side of the first embodiment, the server 10A provided with the functions regarding the search of the moving route in the virtual space is configured so as to include the setting unit 11, the arranging unit 12, the thinning unit 13, and the searching unit 14. Thus, the setting unit 11 sets the navigation mesh corresponding to the movable area of the object in the virtual space; the arranging unit 12 arranges the plurality of waypoints on the set navigation mesh in accordance with the predetermined arrangement rule; the thinning unit 13 thins out some waypoints, which are selected in accordance with the predetermined selection rule, from the plurality of waypoints thus arranged; and the searching unit 14 searches the moving route of the object on the basis of arrangement of the plurality of waypoints after thinning out some waypoints. Therefore, it is possible to reduce a processing load required for a search of a moving route of an object.

Namely, not only by arranging the waypoints, but also by thinning out some waypoints after arrangement of the waypoints, it is possible to reduce the amount of information for search. Therefore, it is possible to reduce a processing load required for a search of a moving route of an object.

In this regard, it has not been mentioned particularly in the first embodiment described above. However, timing when the server 10A executes the respective processes by the setting unit 11, the arranging unit 12, and the thinning unit 13 is not limited particularly. The server 10A may be configured so as to execute the processes at the time when the video game is developed or at the time when the video game is played. Namely, the server 10A may be configured so that the searching unit 14 reads out information that is generated before the player plays the video game; updates the read-out information in accordance with a situation of the video game; and searches a moving route. Further, the server 10A may be configured so that the searching unit 14 searches a moving route by using information that is generated in real time in accordance with progress of the video game (for example, arrangement of waypoints and a generated region).

Second Embodiment

Figure 6:
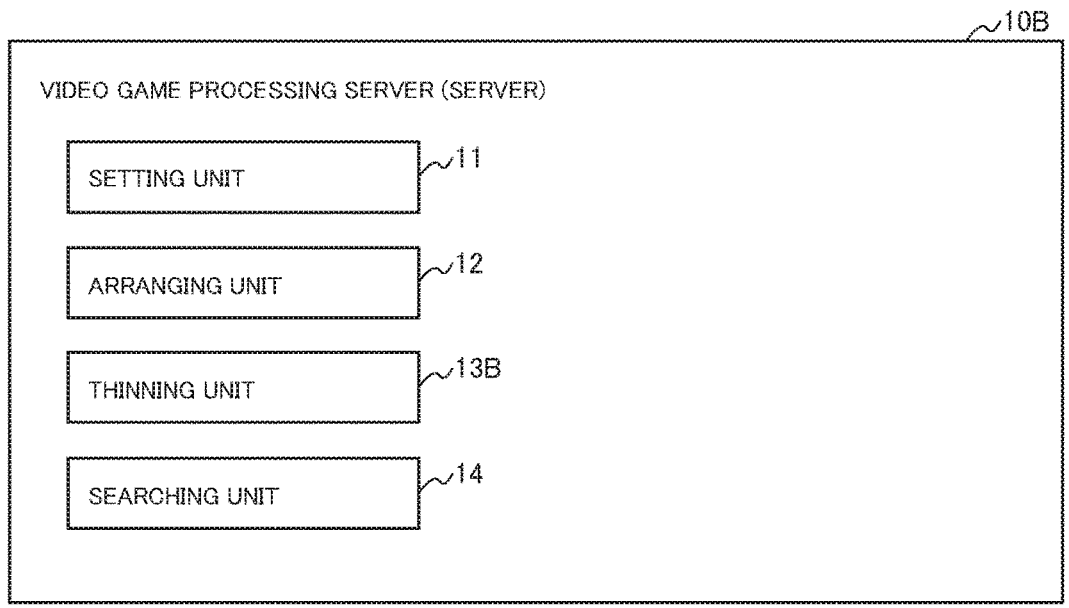
FIG. 6 is a block diagram illustrating a configuration of a server corresponding to at least one of the embodiments of the present invention.

FIG. 6 is a block diagram illustrating a configuration of a video game processing server 10B (hereinafter, referred to as a "server 10B"), which is an example of the video game processing server 10 (see FIG. 1). In the present embodiment, the server 10B at least includes a setting unit 11, an arranging unit 12, a thinning unit 13B, and a searching unit 14.

The thinning unit 13B has a function to refer to a predetermined storage unit (not illustrated in the drawings), in which information on connection between each of a plurality of waypoints and the other waypoint and information regarding the video game are stored so as to be associated with each other, and not to thin out a selected waypoint in a case where the selected waypoint satisfies a predetermined prohibition condition.

Here, the content of a prohibition condition is not limited particularly. However, it is preferable that the prohibition condition has the content indicating a waypoint for which if the waypoint is thinned out, this causes an obstacle to route search. As an example of such content, there is a waypoint in which a distance between a current position of the waypoint and a position of the waypoint after thinning out it becomes too long.

Further, a configuration not to thin out the selected waypoint is not limited particularly. However, it is preferable that a waypoint for which it is determined not to thinned out is not selected in the same process. As an example of such a configuration, there is a configuration in which the thinning unit 13B is configured so as to set identification information to a waypoint that is determined not to be thinned out in the determination after selection.

Figure 7:
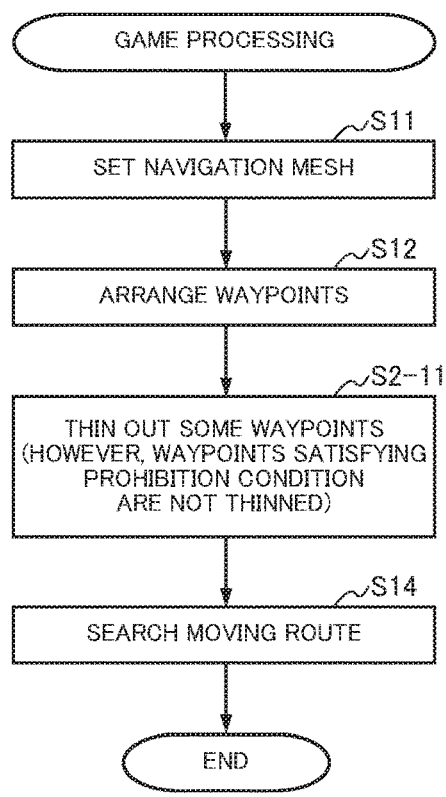
FIG. 7 is a flowchart illustrating an example of game processing corresponding to at least one of the embodiments of the present invention.

FIG. 7 is a flowchart illustrating an example of game processing executed by the video game processing system 100 (see FIG. 1). Hereinafter, operations of the server 10B and a user terminal 20 (hereinafter, referred to as a "terminal 20") will be described as an example. In this regard, a flowchart illustrating an operation of each of the server 10B and the terminal 20 is omitted from a point of view to avoid repeated explanation.

In the game processing, when waypoints are arranged, the server 10B thins out some waypoints (Step S2-11). However, the server 10B does not thin out waypoints each of which satisfies a prohibition condition. In the present embodiment, the server 10B refers to predetermined information to determine whether each of waypoints selected as thinning targets satisfies a prohibition condition or not, and excludes waypoints each of which satisfies the prohibition condition from thinning targets.

As explained above, as one side of the second embodiment, the server 10B is configured so as to include the setting unit 11, the arranging unit 12, the thinning unit 13B, and the searching unit 14. Thus, the thinning unit 13B refers to the predetermined storage unit, in which the information on connection between each of the plurality of waypoints and the other waypoint and the information regarding the video game are stored so as to be associated with each other, and does not thin out the selected waypoint in a case where the selected waypoint satisfies the predetermined prohibition condition. Therefore, it is possible to prevent a waypoint to be remained for a search of a moving route from being thinned out. Further, compared with a case of determining waypoints that are not to be excluded from all waypoints before thinning out them, it is possible to reduce a processing load by an amount that waypoints as determination targets are limited to "waypoints selected as thinning targets".

Third Embodiment

Figure 8:
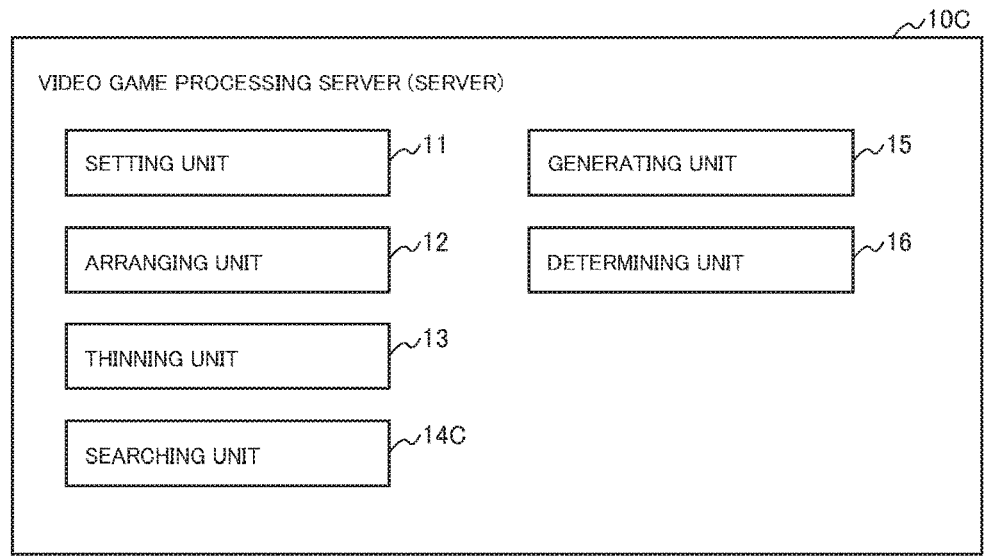
FIG. 8 is a block diagram illustrating a configuration of a server corresponding to at least one of the embodiments of the present invention.

FIG. 8 is a block diagram illustrating a configuration of a video game processing server 10C (hereinafter, referred to as a "server 10C"), which is an example of the video game processing server 10 (see FIG. 1). In the present embodiment, the server 10C at least includes a setting unit 11, an arranging unit 12, a thinning unit 13, a searching unit 14C, a generating unit 15, and a determining unit 16.

The generating unit 15 has a function to generate a plurality of regions by grouping a plurality of waypoints arranged in a virtual space in accordance with a predetermined classification rule.

Here, a configuration to group waypoints in accordance with a predetermined classification rule is not limited particularly. The generating unit 15 may be configured so as to classify the waypoints on the basis of arrangement of the waypoints, or may be configured so as to classify the waypoints on the basis of information associated with the waypoints. As an example of such a configuration, there is a configuration in which a distance between each of the waypoints and an irremovable region (for example, a wall) is classified by a watershed (Watershed) algorithm (or a navigation mesh is divided by arrangement of the respective waypoints after classification).

Further, the phrase "generate a plurality of regions by grouping" means that an area in a virtual space (or a set navigation mesh) in which waypoints belonging to a group are positioned is defined as a region. A configuration to generate a plurality of regions is not limited particularly. The generating unit 15 may be configured so as to generate, as a region, information indicating a group of waypoints belonging to a group, or may be configured so as to generate, as a region, information indicating a part of a navigation mesh from arrangement of waypoints belonging to a group.

The determining unit 16 has a function to determine regions where an object is allowed to move (hereinafter, referred to as "movable regions") on the basis of arrangement of the plurality of regions thus generated.

Here, a configuration to determine movable regions is not limited particularly. The determining unit 16 may be configured so as to be capable of determining, as the movable regions, a plurality of regions coupling a region in which a movement start position is included to a region in which a movement end position is included. As an example of such a configuration, there is a configuration in which a known route search technique is utilized by using the respective regions as nodes. In this regard, the determining unit 16 may be configured so as to determine a connection relationship of the respective regions by using information associated with waypoints that are positioned on a boundary of the regions.

The searching unit 14C has a function to search a moving route of the object on the basis of the waypoints included in the determined movable regions.

Here, a configuration to search a moving route on the basis of waypoints included in the movable regions is not limited particularly. However, it is preferable that the searching unit 14C is configured so as to be capable of searching one route or a plurality of routes that satisfies a search condition. As an example of such a configuration, there is a configuration in which a known route search technique is adopted by using the respective waypoints included in the movable regions as the nodes.

Figure 9:
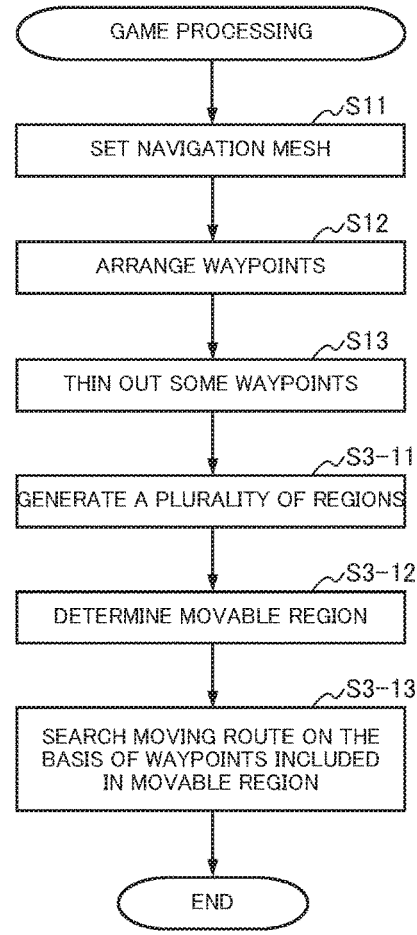
FIG. 9 is a flowchart illustrating an example of game processing corresponding to at least one of the embodiments of the present invention.

FIG. 9 is a flowchart illustrating an example of game processing executed by the video game processing system 100 (see FIG. 1). Hereinafter, operations of the server 10C and a user terminal 20 (hereinafter, referred to as a "terminal 20") will be described as an example. In this regard, a flowchart illustrating an operation of each of the server 10C and the terminal 20 is omitted from a point of view to avoid repeated explanation.

When some waypoints are thinned out, the server 10C generates a plurality of regions (Step S3-11). In the present embodiment, the server 10C generates a plurality of regions by grouping a plurality of waypoints arranged in a virtual space in accordance with a predetermined classification rule.

When the plurality of regions is generated, the server 10C determines movable regions (Step S3-12). In the present embodiment, the server 10C determines movable regions suitable for movement from a region in which a movement start position is included to a region in which a movement end position is included on the basis of arrangement of the plurality of regions thus generated.

When the movable regions are determined, the server 10C searches a moving route on the basis of waypoints included in the movable regions (Step S3-13). In the present embodiment, the server 10C searches a moving route from the movement start position to the movement end position on the basis of waypoints included in the determined movable regions.

As explained above, as one side of the third embodiment, the server 10C is configured so as to include the setting unit 11, the arranging unit 12, the thinning unit 13, the searching unit 14C, the generating unit 15, and the determining unit 16. Thus, the generating unit 15 generates the plurality of regions by grouping the plurality of waypoints arranged in the virtual space in accordance with the predetermined classification rule; the determining unit 16 determines the regions where the object is allowed to move (that is, the movable regions) on the basis of arrangement of the plurality of regions thus generated; and the searching unit 14C searches the moving route of the object on the basis of the waypoints included in the determined movable regions. Therefore, it becomes possible to search a moving route in a stepwise manner, and this makes it possible to reduce a processing load required for a search of a moving route.

Fourth Embodiment

Figure 10:
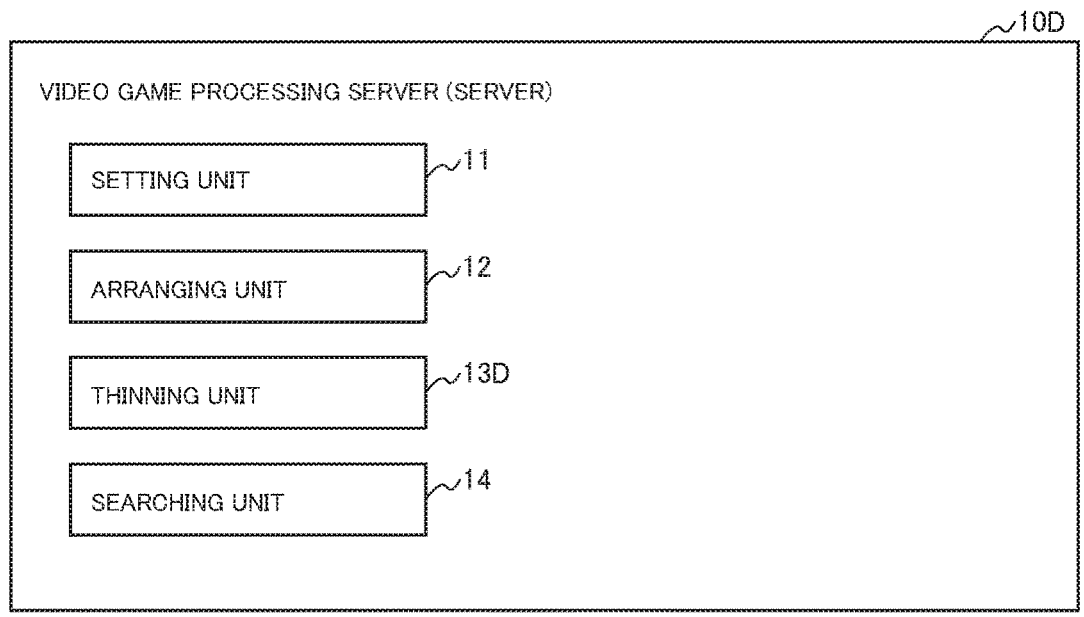
FIG. 10 is a block diagram illustrating a configuration of a server corresponding to at least one of the embodiments of the present invention.

FIG. 10 is a block diagram illustrating a configuration of a video game processing server 10D (hereinafter, referred to as a "server 10D"), which is an example of the video game processing server 10 (see FIG. 1). In the present embodiment, the server 10D at least includes a setting unit 11, an arranging unit 12, a thinning unit 13D, and a searching unit 14.

The thinning unit 13D has a function to preferentially thin out some waypoints other than waypoints that are arranged in a boundary portion of a plurality of regions.

Here, the boundary portion of the plurality of regions means a portion in which a waypoint next to a certain waypoint belongs to another region. A configuration to preferentially thin out some waypoints other than waypoints that are arranged in the boundary portion of the plurality of regions is not limited particularly. However, it is preferable that the thinning unit 13D is configured so that at least one of the waypoints that are arranged in the boundary portion is not thinned out. As an example of such a configuration, there is a configuration in which waypoints arranged in a boundary portion of one region are excluded from thinning targets. In this regard, with respect to timing of thinning out some waypoints, a configuration in which thinning is executed before a plurality of regions is generated, a configuration in which thinning is executed after a plurality of regions is generated, and a configuration in which thinning is executed plural times before and after a plurality of regions is generated are thought.

Figure 11:
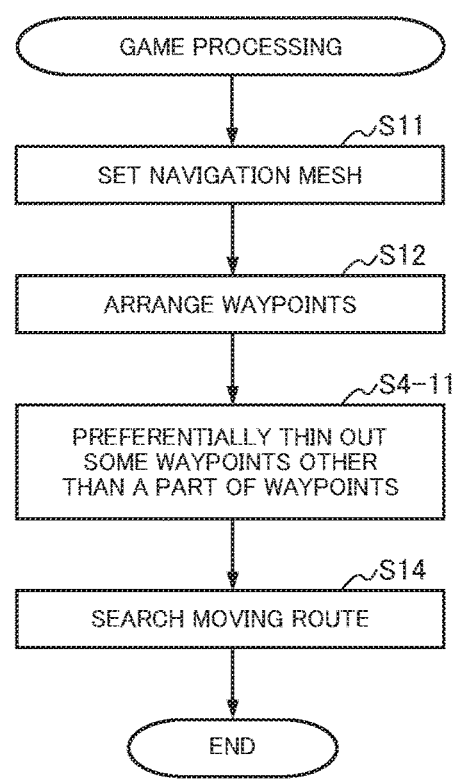
FIG. 11 is a flowchart illustrating an example of game processing corresponding to at least one of the embodiments of the present invention.

FIG. 11 is a flowchart illustrating an example of game processing executed by the video game processing system 100 (see FIG. 1). Hereinafter, operations of the server 10D and a user terminal 20 (hereinafter, referred to as a "terminal 20") will be described as an example. In this regard, a flowchart illustrating an operation of each of the server 10D and the terminal 20 is omitted from a point of view to avoid repeated explanation.

When waypoints are arranged, the server 10D preferentially thins out some waypoints other than a part of the waypoints (Step S4-11). In the present embodiment, the server 10D preferentially thins out some waypoints other than waypoints that are arranged in a boundary portion of a plurality of regions.

As explained above, as one side of the fourth embodiment, the server 10D is configured so as to include the setting unit 11, the arranging unit 12, the thinning unit 13D, and the searching unit 14. Thus, the thinning unit 13D preferentially thins out the waypoints other than the waypoint that are arranged in the boundary portion of the plurality of regions. Therefore, it is possible to prevent excessively thinning.

Fifth Embodiment

Figure 12:
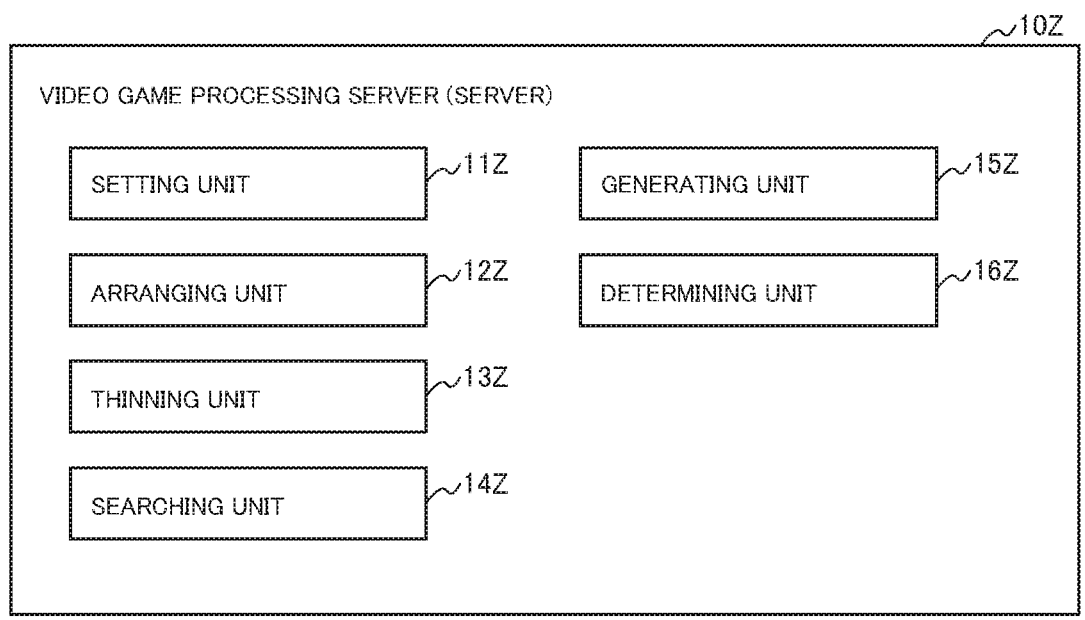
FIG. 12 is a block diagram illustrating a configuration of a server corresponding to at least one of the embodiments of the present invention.

FIG. 12 is a block diagram illustrating a configuration of a video game processing server 10Z (hereinafter, referred to as a "server 10Z"), which is an example of the video game processing server 10 in the video game processing system 100 (see FIG. 1). In the present embodiment, the server 10Z at least includes a setting unit 11Z, an arranging unit 12Z, a thinning unit 13Z, a searching unit 14Z, a generating unit 15Z, and a determining unit 16Z.

The setting unit 11Z has a function to set a navigation mesh corresponding to a movable area of an object in a virtual space. Hereinafter, a case where a navigation mesh is set in a virtual space of a 3D cover shooting game in which a soldier and a weapon appear will be described as an example.

In the present embodiment, an enemy soldier is allowed to search a player from an edge of a map. Further, the enemy soldier can fight with the player anywhere on the map. For that reason, normal movement such as walking or running is carried out on the navigation mesh.

Here, in order to perform functions of the enemy soldier, the server 10Z can search a long and large path from an edge of a map to an opposite edge. In the present embodiment, in order to suppress a search load for a path, a hierarchical type path search is executed. Further, the enemy soldier can go not only to the vicinity of an arranged position but also to a location where the player can go. Namely, the enemy soldier can get over or climb a cover, or move via any of a door, a window, and a ladder. In the present embodiment, in order to secure a degree of freedom of movement, each of the player and the enemy soldier is caused to pass through a location at which the navigation mesh is not continuous by means of a jump link.

Further, in the present embodiment, as functions regarding navigation, movement of a contiguous portion by a NavMesh, movement outside the mesh by a jump link, a hierarchical structure for reducing a search load for a long and large path, and a function to automatically generate data described above will also be described.

Here, as examples of geomorphic expression used for the functions described above, there are a NavMesh, waypoints, a connection graph, and an upper layer graph based on the waypoints.

The NavMesh uses a known technique (for example, recast navigation). Therefore, its detailed explanation herein is omitted. In this regard, in the present embodiment, setting of a passable flag to polygons contiguous from a player initial position, and the like are executed. Since the player can climb a wall with a certain height, a passable flag is also set to polygons that are not contiguous from the player initial position but contiguous from the wall that climbed by the player. In this case, for example, a mesh provided in the vicinity of a position shifted by a height, which can be climbed from an edge where there are no adjacent polygons, is searched. If there is a corresponding mesh, a contiguous flag is set therefrom.

The arranging unit 12Z has a function to arrange a plurality of waypoints on the set navigation mesh in accordance with a predetermined arrangement rule. Hereinafter, a case where waypoints are automatically arranged on the NavMesh offline will be described as an example.

Here, the waypoint plays a role as a base in which information necessary for a video game is embedded. In the present embodiment, information, such as a XYZ position, a NavMesh polygon ID under a point, LOF (Line of Fire), a point attribute, point connection information, an adjacent cover ID, an adjacent door ID, an adjacent ladder/window ID, a shooting cover list, a height from a point location to a ceiling, a height when to get over an adjacent cover, a distance to a wall, or a broken gimmick ID riding on a point, is associated with the waypoint if needed.

Further, in the present embodiment, by arranging points by means of a flood fill algorithm (Floodfill) on the basis of the player initial position, the waypoints are automatically arranged. In this regard, the points may not be formed at required positions due to a grid shape. Therefore, the arranging unit 12Z may be configured so as to add points arbitrarily. In this case, the arranging unit 12Z may be configured so as to receive addition of a waypoint to a location of each of various kinds of objects (for example, a door, a low cover, an edge of a high cover, and a position at which a ladder is installed) in the virtual space.

The thinning unit 13Z has a function to thin out some waypoints, which are selected in accordance with a predetermined selection rule, from the plurality of waypoints thus arranged. Hereinafter, a case where waypoints are thinned out as a process after the waypoints are spread all over will be described as an example. In this regard, it is preferable that an index after thinning out falls within 16 bits. This is because the index of the point should not be increased because it is to be stored here and there. Further, in a case where the number of indexes is large, a load at the time of search thereof increases too much.

Figure 13:
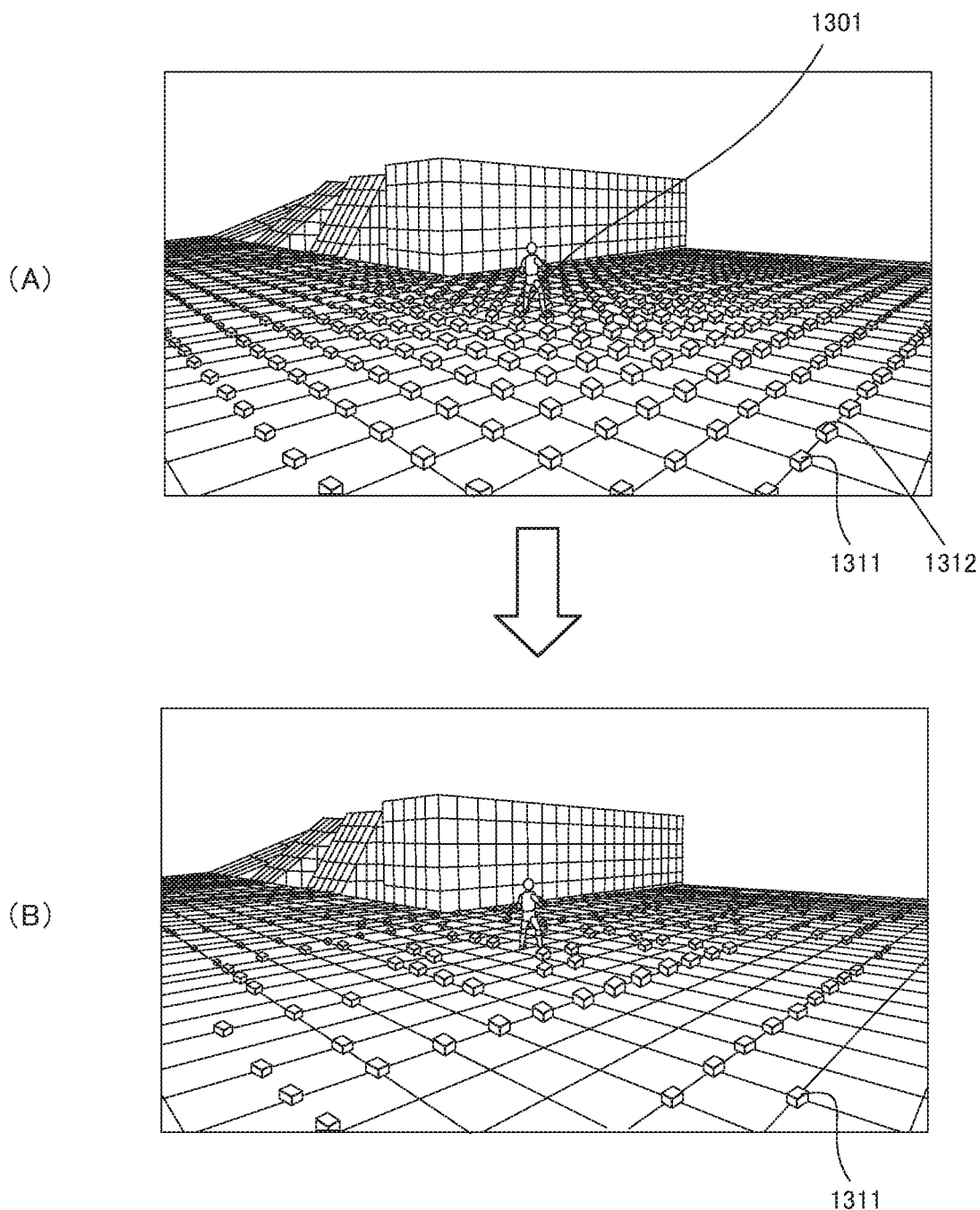
FIG. 13 is an explanatory drawing for explaining an example of thinning of waypoints corresponding to at least one of the embodiments of the present invention.

FIG. 13 is an explanatory drawing for explaining an example of thinning of waypoints. In the present embodiment, by selecting points in a random manner after automatically arranging a plurality of waypoints (for example, a waypoint 1311 and a waypoint 1312) on the basis of a player initial position 1301 (see FIG. 13A), the arranged waypoints are thinned out (see FIG. 13B). Further, in the present embodiment, some points that should not be thinned out are not thinned out. Namely, for example, in a case where a waypoint corresponding to a point where a distance between positions before and after thinning out the waypoint is too long, a point where a graph is cut by thinning out the waypoint, a point that becomes a too roundabout route by thinning out the waypoint, a boundary of an upper layer graph node, a location that becomes a trigger of an action such as a door, or the like is selected, the corresponding waypoint is not thinned out.

Figure 14:
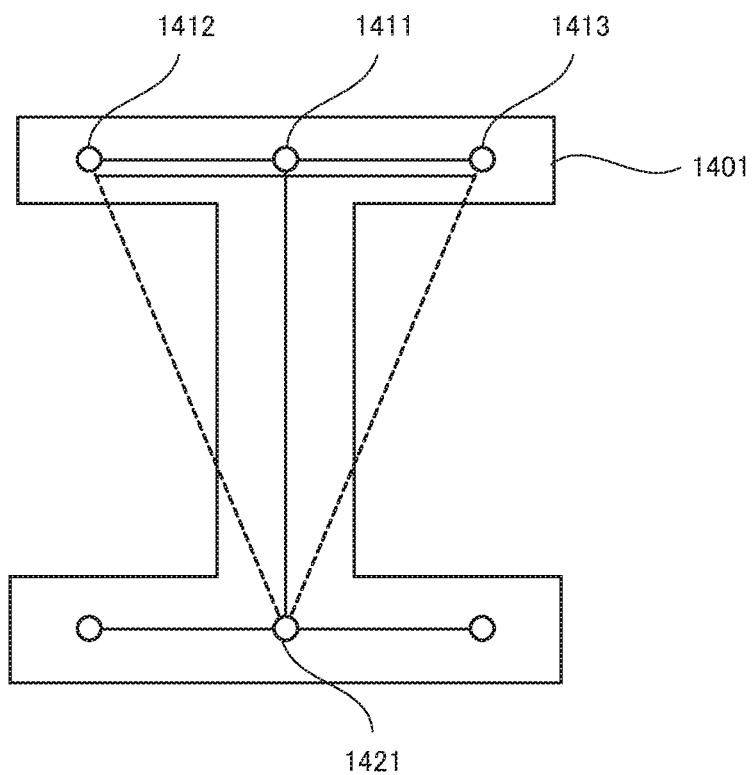
FIG. 14 is an explanatory drawing for explaining an example of a waypoint, which must be not thinned out, corresponding to at least one of the embodiments of the present invention.

FIG. 14 is an explanatory drawing for explaining an example of waypoints that should not be thinned out. As illustrated in FIG. 14, if a waypoint 1411 is deleted from an area 1401 to which a NavMesh is set, connection between upper and lower portions thereof is lost. Namely, a Raycast on the NavMesh cannot pass through the waypoint 1411 from each of a waypoint 1412 and a waypoint 1413. For that reason, the waypoint 1411 is not thinned out.

The searching unit 14Z has a function to search a moving route of the object on the basis of arrangement of the plurality of waypoints after thinning out some waypoints. Hereinafter, a case where a route search for a route from a start point to an end point, such as a route from an enemy's position to a player's position, a route from an enemy's position to a target object, or a route from a player's position to a position selected by the player, is performed by using a known route search technique in which arranged waypoints are used as route candidate locations will be described as an example.

The generating unit 15Z has a function to generate a plurality of regions by grouping the plurality of waypoints arranged in the virtual space in accordance with a predetermined classification rule. Hereinafter, a case where regions in which points close in position are got together to an extent and labeled (AI regions) are generated as a structure of an uppermost layer for a hierarchical type path search will be described as an example. In this regard, information on point connection of a label boundary is used as connection information for specifying a connection relationship among the plurality of regions. Namely, in order to determine regions for moving from a region in which a movement start position is included to a region in which a movement target position is included, information associated with each of the waypoints that are positioned in a boundary of the respective regions is utilized.

In the present embodiment, the AI region plays a role of dealing with points as a certain level of lump. It is preferable that the AI region is configured so as to roughly express a position without being too detailed. Further, the AI region also has a role as a cost-added target that prevents the object from passing through the same path. The AI region can also be utilized for a map of a degree of influence between a player and an enemy (influence map) and the like. Moreover, it is possible to expect that the AI region allows a search load for a path to be reduced by hierarchization of positional representation.

Figure 15:
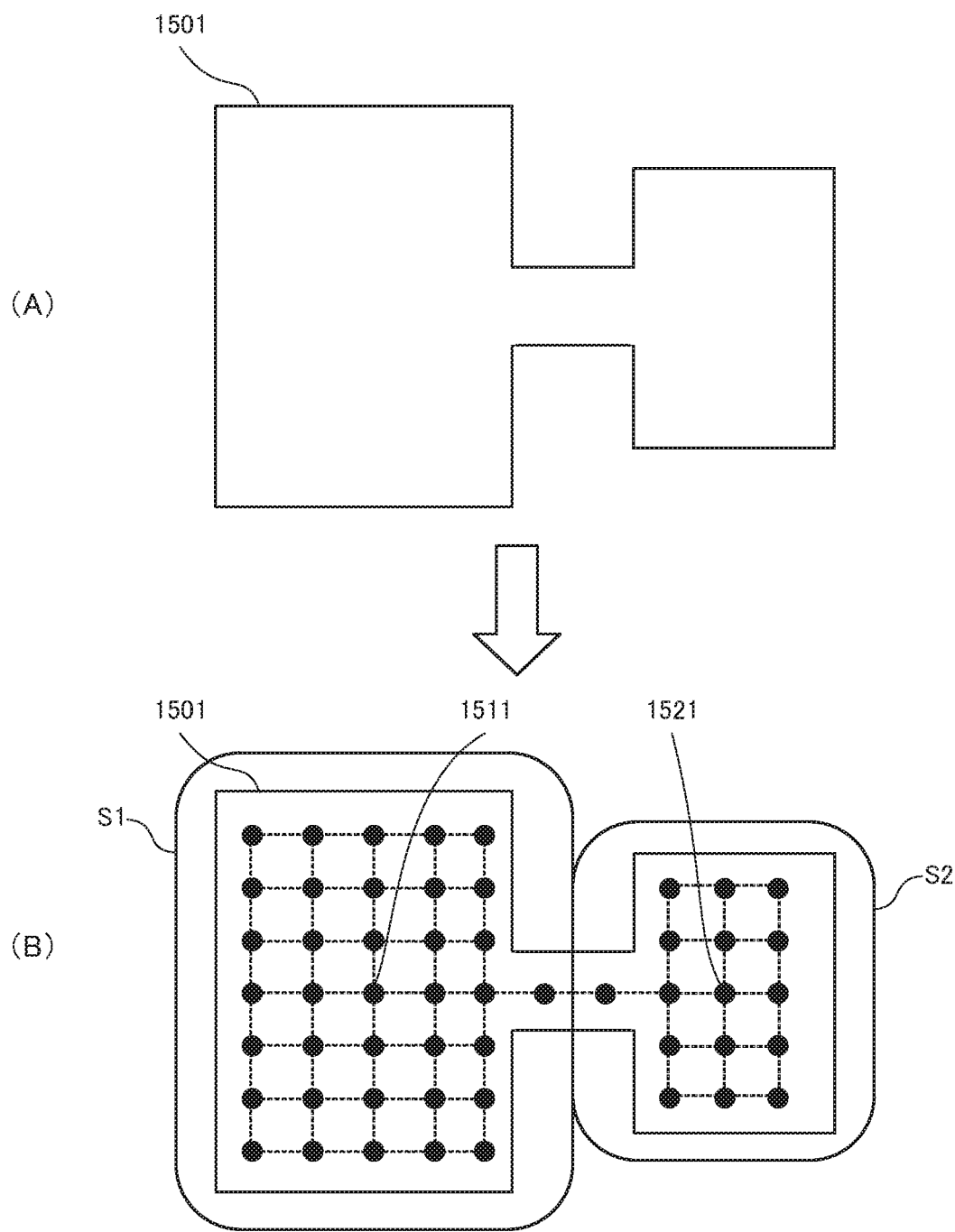
FIG. 15 is an explanatory drawing for explaining an example of a method of generating a region corresponding to at least one of the embodiments of the present invention.

FIG. 15 is an explanatory drawing for explaining an example of a method of generating a region. As illustrated in FIG. 15A, in a case where a region (that is, an A region according to the present embodiment) is generated from a landform 1501, waypoints are spread all over the landform 1501; adjacent waypoints are connected to each other; a distance from a corresponding wall is set for each of the waypoints; and the set distance is divided by a watershed (Watershed) algorithm. Thus, as illustrated in FIG. 15B, a region S1 and a region S2 can be generated. In this regard, the watershed algorithm is explained supplementarily. In a case where a distance from a wall is considered as a height, a first mountain with a waypoint 1511 at the top thereof and a second mountain with a waypoint 1512 at the top thereof can be formed. When evaluation is started from the highest point, the waypoint 1511 is first labeled (label 1). Subsequently, by lowering the height to be evaluated, two points respectively positioned at upper and lower sides of the waypoint 1511 in the first mountain, and the top of the second mountain (that is, the waypoint 1512) are evaluated. In this case, since the point of the second mountain is the top thereof, the waypoint 1512 is labeled (label 2). Since the two points of the first mountain are a part of the first mountain, the two points are labeled in the similar manner to the top of the first mountain (that is, the waypoint 1511) (label 1). In this regard, whether a certain point is a part of a mountain or not can be determined by determining whether an adjacent point thereof has already been labeled or not. Subsequently, by executing the similar process after lowering the height to be evaluated, remaining points are labeled to the bottom of the first mountain and the bottom of the second mountain. Finally, each of portions that are not included in each of the first and second mountains (that is, portions whose distance from the corresponding wall is determined to be zero or the minimum) is labeled from the adjacent point thereof. From the above, it is possible to label the points up to the lowest height. Namely, it is possible to generate an upper layer graph by nodes of label 1 and nodes of label 2.

Further, in the present embodiment, the generated regions are adjusted on the basis of a predetermined adjustment rule. Namely, regions each of which satisfies a predetermined division condition are divided from the plurality of regions, and a region that satisfies a predetermined merge condition is merged with another region. By configuring the generating unit 15Z in this manner, each of too small regions is attached to an adjacent large region, and a too large region is repeatedly cut so that "a long side thereof is cut into half". By forming the regions so as to have a certain size in this manner, it is possible to roughly deal with them as "units". In this regard, the generating unit 15Z is not configured so as to generate each of the regions with a size that falls within a certain range, but the generating unit 15Z may be configured to provide the division condition and the merge condition so that each of the regions satisfies any one of a plurality of size conditions.

The determining unit 16Z has a function to determine regions where an object is allowed to move (hereinafter, referred to as "movable regions") on the basis of arrangement of the plurality of regions thus generated. In the present embodiment, a case where a known route search technique is utilized by using the respective regions as nodes will be described as an example.

As described above, the data are created in the order of a NavMesh, a waypoint graph, and an upper layer graph, and this makes it possible to perform a path search in the order of the upper layer graph, the waypoint graph, and the NavMesh.

In this regard, the moving route finally desired by the path search is a smooth moving route to an extent intended by a designer of the video game. Namely, it is preferable that the determining unit 16Z is configured so that a Bezier curve, a straight line, or a line that requires an action because a line from a current position of an object to a target position is not contiguous can be derived in accordance with a type of the object. In the present embodiment, by specifying an action and a position required in an upper layer graph level, specifying an action and a position required in a waypoint level, and searching a moving route on which the object continuously moves between the specified positions, various kinds of lines can be derived. In this regard, a route for contiguous (or continuous) movement can be derived by passing through an upper layer path, creating a path of waypoints in an upper layer node, connecting waypoints of all nodes, creating a NavMesh polygon list along a point path, creating a list of edges through which the object passes, and creating a Bezier curve by using an intermediate point of the edges.

Figures 16, 17:
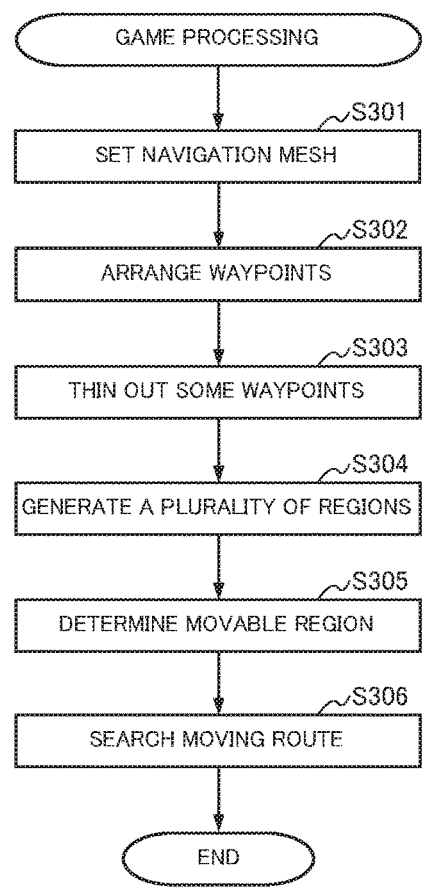
FIG. 16 is an explanatory drawing for explaining an example of a storage state of information corresponding to at least one of the embodiments of the present invention.
FIG. 17 is a flowchart illustrating an example of game processing corresponding to at least one of the embodiments of the present invention.

FIG. 16 is an explanatory drawing for explaining an example of a storage state of information stored in a storage unit (not illustrated in the drawings) with which the server 10 is provided. As illustrated in FIG. 16, a region number and identification information of each of waypoints belonging to a region are stored as region related information in the storage unit so as to be associated with each other.

Here, the region number means identification information of each of the generated regions (for example, the AI region). A configuration to create a region number is not limited particularly. However, it is preferable that the server 10Z is configured so that each of a plurality of regions can be specified uniquely. As an example of the region number, there is a label attached to each of the waypoints.

FIG. 17 is a flowchart illustrating an example of game processing executed by a video game processing system 100Z (hereinafter, referred to as a "system 100Z") provided with the server 10Z. In the game processing according to the present embodiment, a process regarding arrangement of waypoints and the like are executed. Hereinafter, each of the processes will be described. In this regard, the order of the respective processes may be changed without any contradiction or the like of processing content.

The game processing is started in a case where a user terminal 20 (hereinafter, referred to as a "terminal 20") that accesses the server 10Z satisfies an arrangement condition of waypoints, for example. Hereinafter, a case where a user who operates the terminal 20 inputs a search request for a moving route will be described as an example.

In the game processing, the system 100Z first sets a navigation mesh (Step S301). In the present embodiment, the server 10Z specifies a virtual space to be provided to the terminal 20, and sets a navigation mesh corresponding to an area in the specified virtual space in which an object can move.

When the navigation mesh is set, the system 100Z arranges waypoints (Step S302). In the present embodiment, the server 10Z arranges a plurality of waypoints on the set navigation mesh in accordance with a predetermined arrangement rule.

When the waypoints are arranged, the system 100Z thins out some waypoints (Step S303). In the present embodiment, the server 10Z thins out some waypoints selected in accordance with a predetermined selection rule from the plurality of waypoints thus arranged.

When some waypoints are thinned out, the system 100Z generates a plurality of regions (Step S304). In the present embodiment, the server 10Z generates a plurality of regions by grouping the plurality of waypoints arranged in the virtual space in accordance with a predetermined classification rule.

When the plurality of regions is generated, the system 100Z determines movable regions (Step S305). In the present embodiment, the server 10Z determines movable regions suitable for movement from a region in which a movement start position is included to a region in which a movement end position is included on the basis of arrangement of the plurality of regions thus generated.

When the movable regions are determined, the system 100Z searches a moving route (Step S306). In the present embodiment, the server 10Z searches a moving route of the object on the basis of arrangement of the plurality of waypoints that is arranged in the virtual space.

As explained above, as one side of the fifth embodiment, the server 10Z provided with the functions regarding a search of the moving route in the virtual space is configured so as to include the setting unit 11Z, the arranging unit 12Z, the thinning unit 13Z, the searching unit 14Z, the generating unit 15Z, and the determining unit 16Z. Thus, the setting unit 11Z sets the navigation mesh corresponding to the movable area of the object in the virtual space; the arranging unit 12Z arranges the plurality of waypoints on the set navigation mesh in accordance with the predetermined arrangement rule (for example, the flood fill algorithm); the thinning unit 13Z thins out some waypoints, which are selected in accordance with the predetermined selection rule (for example, random selection), from the plurality of waypoints thus arranged; and the searching unit 14Z searches the moving route of the object on the basis of arrangement of the plurality of waypoints after thinning out them. Therefore, it is possible to reduce a processing load required for a search of a moving route of an object.

Namely, not only by arranging the waypoints, but also by thinning out some waypoints after arrangement of the waypoints, it is possible to reduce the amount of information for search. Therefore, it is possible to reduce a processing load required for a search of a moving route of an object.

In this regard, it has not been mentioned particularly in the fifth embodiment described above. However, timing when the server 10Z executes the respective processes by the setting unit 11Z, the arranging unit 12Z, the thinning unit 13Z, the generating unit 15Z, and the determining unit 16Z is not limited particularly. The server 10Z may be configured so as to execute the processes at the time when the video game is developed or at the time when the video game is played. Namely, the server 10Z may be configured so that setting of the NavMesh, arrangement of the waypoints, and generation of the AI region are executed independently from the route search, or may be configured so that they are executed in a series of flow with the route search. As an example of such a configuration, there is a configuration in which the searching unit 14Z reads out, in accordance with progress of the video game, information that is generated before the player plays the video game (for example, the region related information); updates the read-out information in accordance with a situation of the video game (for example, change of a movable region); and searches a moving route on the basis of the updated information. Further, as another example, there is a configuration in which the searching unit 14 sets a navigation mesh in accordance with progress of the video game, and searches a moving route in real time by using generated information.

In this regard, it has not been mentioned particularly in the fifth embodiment described above. However, the server 10Z may be configured so as to: set a navigation mesh corresponding to a movable area of an object in a virtual space; arrange a plurality of waypoints on the set navigation mesh in accordance with a predetermined arrangement rule (for example, the flood fill algorithm); thin out some waypoints, which are selected in accordance with a predetermined selection rule (for example, random selection), from the plurality of waypoints thus arranged; and store information for a search containing arrangement of the thinned waypoints (for example, geomorphic expression of the virtual space) in the storage unit. In this case, the server 10Z that obtains information related to the video game containing the information for search searches a moving route of the object in the virtual space on the basis of the information for search.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following inventions can be at least performed by a person having a normal skill in the art to which the present invention belongs.

(1)

A non-transitory computer-readable medium including a video game processing program for causing a server to perform functions regarding a search of a moving route in a virtual space, the functions comprising:

a setting function configured to set a navigation mesh corresponding to a movable area of an object in a virtual space;

an arranging function configured to arrange a plurality of waypoints on the set navigation mesh in accordance with a predetermined arrangement rule;

a thinning function configured to thin out some waypoints, which are selected in accordance with a predetermined selection rule, from the plurality of waypoints thus arranged; and a searching function configured to search a moving route of the object on a basis of arrangement of the plurality of thinned waypoints.

(2)

The non-transitory computer-readable medium according to (1), wherein the thinning function includes a function configured to refer to a predetermined storage unit, in which information on connection between each of the plurality of waypoints and the other waypoint and information regarding the video game are stored so as to be associated with each other, and not to thin out the selected waypoint in a case where the selected waypoint satisfies a predetermined prohibition condition.

(3)

The non-transitory computer-readable medium according to (1) or (2), wherein the functions further include:

a generating function configured to generate a plurality of regions by grouping the plurality of waypoints arranged in the virtual space in accordance with a predetermined classification rule; and a determining function configured to determine a region in which the object moves (hereinafter, referred to as a "movable region") on a basis of arrangement of the plurality of regions thus generated, wherein the searching function further includes a function configured to search the moving route of the object on a basis of waypoints included in the determined movable region.

(4)

The non-transitory computer-readable medium according to any one of (1) to (3), wherein the thinning function includes a function configured to preferentially thin out some waypoints other than waypoints arranged in a boundary portion of a plurality of regions.

(5)

The non-transitory computer-readable medium according to any one of (1) to (4), wherein the thinning function includes a function configured to thin out the waypoints so that the number of a plurality of waypoints becomes less than a predetermined number.

(6)

A non-transitory computer-readable medium including a video game processing program for causing a user terminal to perform at least one function of the functions that the video game processing program described in any one of (1) to (5) causes the server to perform, the user terminal being capable of communicating with the server.

(7)

A server into which the video game processing program described in any one of (1) to (6) is installed.

(8)

A video game processing system for executing a process regarding a search of a moving route in a virtual space, the video game processing system comprising a communication network, a server, and a user terminal, the video game processing system comprising:

a setting unit configured to set a navigation mesh corresponding to a movable area of an object in a virtual space;

an arranging unit configured to arrange a plurality of waypoints on the set navigation mesh in accordance with a predetermined arrangement rule;

a thinning unit configured to thin out some waypoints, which are selected in accordance with a predetermined selection rule, from the plurality of waypoints thus arranged; and a searching unit configured to search a moving route of the object on a basis of arrangement of the plurality of thinned waypoints.

(9)

The video game processing system according to (8), wherein the server includes the setting unit, the arranging unit, the thinning unit, and the searching unit, and wherein the user terminal includes an outputting unit configured to output a game screen to a display screen of a display device, the game screen indicating the moving route searched by the searching unit.

(10)
A non-transitory computer-readable medium including a video game processing program for causing a user terminal to perform terminal functions regarding a search of a moving route in a virtual space, the terminal functions comprising:
a function configured to receive, from a server, information regarding server functions included in the server; and
a function configured to execute an input or an output corresponding to each of the server functions,
wherein the server comprises the server functions including:
a setting function configured to set a navigation mesh corresponding to a movable area of an object in a virtual space;
an arranging function configured to arrange a plurality of waypoints on the set navigation mesh in accordance with a predetermined arrangement rule;
a thinning function configured to thin out some waypoints, which are selected in accordance with a predetermined selection rule, from the plurality of waypoints thus arranged; and
a searching function configured to search a moving route of the object on a basis of arrangement of the plurality of thinned waypoints.
(11)
A non-transitory computer-readable medium including a video game processing program for causing a user terminal to perform functions regarding a search of a moving route in a virtual space, the functions comprising:
a setting function configured to set a navigation mesh corresponding to a movable area of an object in a virtual space;
an arranging function configured to arrange a plurality of waypoints on the set navigation mesh in accordance with a predetermined arrangement rule;
a thinning function configured to thin out some waypoints, which are selected in accordance with a predetermined selection rule, from the plurality of waypoints thus arranged; and
a searching function configured to search a moving route of the object on a basis of arrangement of the plurality of thinned waypoints.
(12)
A non-transitory computer-readable medium including a video game processing program for causing a server to perform at least one function of the functions that the video game processing program described in (11) causes the user terminal to perform, the server being capable of communicating with the user terminal.
(13)
A user terminal into which the video game processing program according to (11) or (12) is installed.
(14)
A video game processing method of executing a process regarding a search of a moving route in a virtual space, the video game processing method comprising:
a setting process configured to set a navigation mesh corresponding to a movable area of an object in a virtual space;
an arranging process configured to arrange a plurality of waypoints on the set navigation mesh in accordance with a predetermined arrangement rule;
a thinning process configured to thin out some waypoints, which are selected in accordance with a predetermined selection rule, from the plurality of waypoints thus arranged; and
a searching process configured to search a moving route of the object on a basis of arrangement of the plurality of thinned waypoints.
(15)
A video game processing method of executing a process regarding a search of a moving route in a virtual space by a video game processing system, the video game processing system including a communication network, a server, and a user terminal, the video game processing method comprising:
a setting process configured to set a navigation mesh corresponding to a movable area of an object in a virtual space;
an arranging process configured to arrange a plurality of waypoints on the set navigation mesh in accordance with a predetermined arrangement rule;
a thinning process configured to thin out some waypoints, which are selected in accordance with a predetermined selection rule, from the plurality of waypoints thus arranged; and
a searching process configured to search a moving route of the object on a basis of arrangement of the plurality of thinned waypoints.
(16)
A non-transitory computer-readable medium including a video game processing program for causing a computer to perform functions regarding a search of a moving route in a virtual space, the functions comprising:
a setting function configured to set a navigation mesh corresponding to a movable area of an object in a virtual space;
an arranging function configured to arrange a plurality of waypoints on the set navigation mesh in accordance with a predetermined arrangement rule; and
a thinning function configured to thin out some waypoints, which are selected in accordance with a predetermined selection rule, from the plurality of waypoints thus arranged.
(17)
A non-transitory computer-readable medium including a video game processing program for causing a computer to perform functions regarding a search of a moving route in a virtual space, the functions comprising:
a setting function configured to set a navigation mesh corresponding to a movable area in a virtual space;
an arranging function configured to arrange a plurality of waypoints on the set navigation mesh in accordance with a predetermined arrangement rule;
a thinning function configured to thin out some waypoints, which are selected in accordance with a predetermined selection rule, from the plurality of waypoints thus arranged; and
a searching function configured to search a moving route of an object arranged in the virtual space on a basis of information generated by using the setting function, the arranging function, and the thinning function.
(18)
A non-transitory computer-readable medium including a video game processing program for causing a computer to perform functions to generate information used for a search of a moving route in a virtual space, the functions comprising:
a setting function configured to set a navigation mesh corresponding to a movable area of an object in a virtual space;

an arranging function configured to arrange a plurality of waypoints on the set navigation mesh in accordance with a predetermined arrangement rule;

a thinning function configured to thin out some waypoints, which are selected in accordance with a predetermined selection rule, from the plurality of waypoints thus arranged; and a storing function configured to store information for search in a storage unit, the information for search containing arrangement of the thinned waypoints.

INDUSTRIAL APPLICABILITY

According to one of the embodiments of the present invention, it is useful to reduce a processing load required for a search of a moving route of an object.

What is claimed is:

1. A non-transitory computer-readable medium including a video game processing program for causing a server to perform functions regarding a search of a moving route in a virtual space, the functions comprising:
   a setting function configured to set a navigation mesh corresponding to a movable area of an object in a virtual space;
   an arranging function configured to arrange a first plurality of waypoints on the set navigation mesh in accordance with a predetermined arrangement rule;
   a thinning function configured to remove a second plurality of waypoints, which are selected in accordance with a predetermined selection rule, from the first plurality of waypoints thus arranged; and
   a searching function configured to search a moving route of the object on a basis of arrangement of the second plurality of removed waypoints.

2. The non-transitory computer-readable medium according to claim 1,
   wherein the thinning function includes a function configured to refer to a predetermined storage unit that is configured to store information on connection between each waypoint of the first plurality of waypoints and an other waypoint of the first plurality of waypoints and information regarding the video game associated with each other, and wherein the thinning function is further prohibited to remove the selected waypoint if the selected waypoint satisfies a predetermined prohibition condition.

3. The non-transitory computer-readable medium according to claim 1,
   wherein the functions further include:
   a generating function configured to generate a plurality of regions by grouping the plurality of waypoints arranged in the virtual space in accordance with a predetermined classification rule; and
   a determining function configured to determine a movable region in which the object moves on a basis of arrangement of the plurality of regions thus generated,
   wherein the searching function further includes a function configured to search the moving route of the object on a basis of waypoints included in the determined movable region.

4. The non-transitory computer-readable medium according to claim 1,
   wherein the thinning function includes a function configured to preferentially remove a portion of waypoints than an other portion of waypoints among the first plurality of waypoints arranged in a boundary portion of a plurality of regions.

5. The non-transitory computer-readable medium according to claim 1,
   wherein the thinning function includes a function configured to remove the second plurality of waypoints so that the number of the first plurality of waypoints becomes less than a predetermined number.

6. A video game processing system for executing a process regarding a search of a moving route in a virtual space, the video game processing system comprising a communication network, a server, and a user terminal, the video game processing system comprising:
   a setting unit configured to set a navigation mesh corresponding to a movable area of an object in a virtual space;
   an arranging unit configured to arrange a first plurality of waypoints on the set navigation mesh in accordance with a predetermined arrangement rule;
   a thinning unit configured to remove a second plurality of waypoints, which are selected in accordance with a predetermined selection rule, from the first plurality of waypoints thus arranged; and
   a searching unit configured to search a moving route of the object on a basis of arrangement of the second plurality of removed waypoints.

7. A non-transitory computer-readable medium including a video game processing program for causing a user terminal to perform functions regarding a search of a moving route in a virtual space, the functions comprising:
   a setting function configured to set a navigation mesh corresponding to a movable area of an object in a virtual space;
   an arranging function configured to arrange a first plurality of waypoints on the set navigation mesh in accordance with a predetermined arrangement rule;
   a thinning function configured to remove a second plurality of waypoints, which are selected in accordance with a predetermined selection rule, from the first plurality of waypoints thus arranged; and
   a searching function configured to search a moving route of the object on a basis of arrangement of the second plurality of removed waypoints.

* * * * *